Dec. 31, 1957 H. H. ABBOTT 2,818,558

KEY PULSING CIRCUIT

Filed June 17, 1954 2 Sheets-Sheet 1

INVENTOR
H. H. ABBOTT

BY R. O. Covell

ATTORNEY

INVENTOR
H. H. ABBOTT
BY
R. O. Covell
ATTORNEY 2,818,558

KEY PULSING CIRCUIT

Henry H. Abbott, Yonkers, N. Y., assignor to Bell Telephone Laboratories, Incorporated, New York, N. Y., a corporation of New York Application June 17, 1954, Serial No. 437,500

6 Claims. (Cl. 340—359)

This invention relates to key pulsing circuits and more particularly to key pulsing circuits which produce high speed direct-current pulses.

In switching systems and computers which utilize direct-current counting pulses, it is generally desirable to increase the rate at which such pulses are handled. The primary factor which has heretofore limited the pulse rate in such systems and computers has been the means for producing such pulses. Receiving apparatus capable of receiving direct-current pulses at a much higher rate than can be produced by the mechanical means such as dials or contacting devices utilized in many of such systems, is known to those skilled in the art. The pulse rate of the direct-current pulses produced by present dials or contacting devices cannot be increased appreciably because of mechanical limitations and because of the unreliability of such pulses when produced at a high rate of speed. Electronic key pulsing means have been proposed heretofore which are capable of producing direct-current counting pulses at higher rates than possible with mechanical dials or contacting devices. These electronic means, however, require such high operating potentials and consume so much power in producing the pulses that they have been limited to applications where these factors are not critical. Another disadvantage of known electronic key pulsing devices is that they are generally of such a size as to preclude their use in applications where size is an important factor.

One object of the present invention is to provide an improved key pulsing circuit for producing direct-current pulses which is faster in operation, which consumes less power, which requires lower operating potentials, and which is smaller and more compact in structure.

A feature of the present invention resides in the use of a chain of RC networks and transistors, rendered operative in sequence by activation of a key to produce direct-current signaling pulses.

A further feature of the present invention involves utilization of transistors connected as two-terminal, voltage responsive devices to sequentially control the charging of a chain of condensers whereby direct-current voltage pulses are produced corresponding in number to the number of condensers charged.

A further feature of the present invention resides in the means for producing direct-current voltage pulses at a higher rate of speed without the use of mechanical contacts.

A further feature of the present invention resides in the use of transistors to produce direct-current pulses, these transistors being controlled by sets of key members which, when operated, determine the number of direct-current pulses produced.

A further feature of the present invention resides in the use of transistors in combination with condensers in a key operated pulsing circuit requiring low operating potentials and having a low power consumption to produce direct-current counting pulses.

A further feature of the present invention resides in the means utilizing transistors for producing a train of direct-current counting pulses which is preceded by an open interval of predetermined duration.

Transistors of one type suitable for use with the key pulsing circuit of the present invention are disclosed in Patent 2,524,035, issued to John Bardeen and W. H. Brattain, October 3, 1950. Such devices comprise a small block of semiconductive material such as N-type or P-type germanium. With it are associated three electrodes; one of these, known as the base electrode, makes a low resistance contact with one face of the germanium block and may take the form of a plated metal film whereas the other two, one termed the "emitter" and the other the "collector," may, for example, make point type contact with another face of the block. Other designs in which the three electrodes function to produce transistor properties are applicable also.

The transistor two-terminal, voltage responsive device utilized in the present invention is disclosed and claimed in the copending application of B. J. Bjornson and E. Bruce, Serial No. 334,552, filed on February 2, 1953. Essentially, this two-terminal, voltage responsive device is a voltage control switch which in one state presents a high impedance to the flow of current and in its other state presents a low impedance to the flow of current.

In accordance with an exemplary embodiment of the present invention, a plurality of condensers connected in parallel are sequentially charged to a predetermined voltage. Interposed between each of the condensers in the parallel combination is a two-terminal, voltage responsive device which in one state presents a high impedance to the flow of current and in its other state presents a low impedance. The number of the condensers to be charged in a sequential manner is controlled by the operation of selecting keys or push buttons. By the operation of any one of the keys or push buttons of the circuit, a voltage is applied to charge the first condenser of the parallel combination of condensers. When the charge on this first condenser attains a predetermined value, the voltage responsive circuit associated therewith changes from its high impedance state to its low impedance state and permits the next successive condenser in the parallel combination of condensers to be charged. When this second condenser is charged to a predetermined voltage, the voltage responsive circuit associated therewith will change from its high impedance state to its low impedance state and permit the third condenser in the parallel combination of condensers to receive a charge and so on. The operation of the push buttons or selecting keys associated with this circuit determines merely the number of condensers in the parallel combination of condensers which will be sequentially charged. As each condenser is charging, current in the circuit will decrease and as each of the voltage responsive elements changes from its high impedance state to its low impedance state, the current will abruptly increase. These decreases and increases in the flow of current in the circuit will produce a train of direct-current pulses corresponding in number to the number of condensers receiving a charge. The number of the pulses produced is thereby controlled by the particular one of the keys or push buttons operated.

Other objects and features of the present invention will be better understood from a detailed study of the specification hereinafter with reference to the attached drawing in which.

Figure 1:
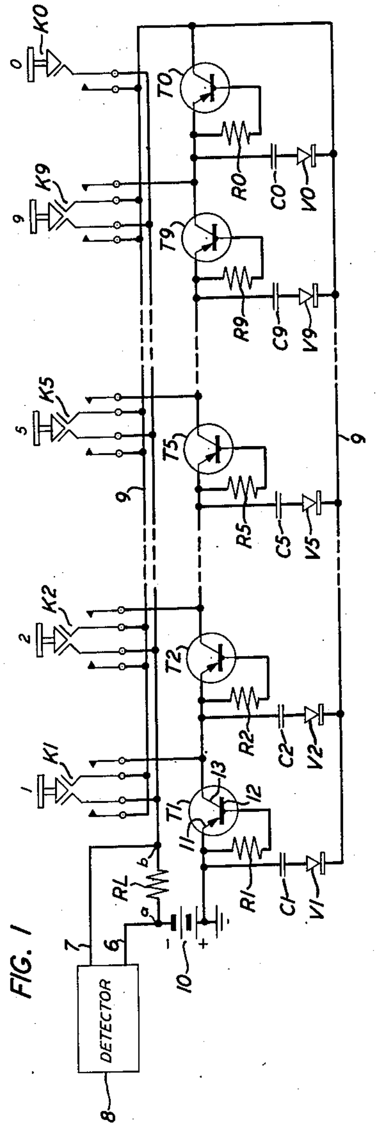
Fig. 1 is a schematic diagram of a key pulsing circuit embodying the present invention.

Referring now to the drawings, Fig. 1 shows a key pulsing circuit comprising a plurality of transistors designated T1 through T0, a plurality of condensers designated C1 through C0, a plurality of unilateral conducting devices designated V1 through V0, a plurality of resistors designated R1 through R0, a plurality of key buttons designated K1 through K0 and a resistor RL.

The transistors T1 through T0 shown in Fig. 1 each possess an emitter electrode 11, a collector electrode 13 and a base electrode 12. In the conventional symbol, the emitter is indicated by the arrow and the direction of positive emitter current flow is indicated by the direction of the arrow. Thus, a transistor having an N-type semiconductive body is indicated by a symbol in which the emitter arrow points toward the base, whereas one having a P-type semiconductive body is indicated by a symbol in which the emitter arrow points away from the base. For convenience in this and succeeding figures, the conventional transistor symbol has the emitter arrow pointing towards the base and all battery and unilateral conducting device polarities are chosen for the indicated direction of positive emitter current flow. The illustrated embodiments of the invention are not, however, limited to N-type point contact transistors. For the P-type point contact transistors in which positive emitter current flows in the opposite direction, all battery and unilateral conducting device polarities will be reversed from that shown in the drawings.

Figure 3:
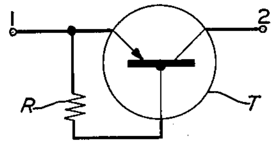
Fig. 3 is a simplified schematic diagram of the two-terminal, voltage responsive device utilized in the key pulsing circuits of Figs. 1 and 2.
Figure 4:
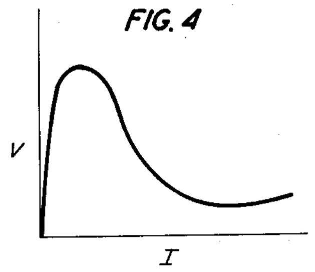
Fig. 4 is a graph illustrating the voltage-current relationship of the two-terminal, voltage responsive device shown in Fig. 3.

Each of the transistors T1 through T0 shown in Fig. 1 and its associated resistors R1 through R0 form a two-terminal, voltage responsive device which has two impedance states, a high impedance state in the order of megohms and a low impedance state in the order of a few ohms. The two-terminal, voltage responsive device utilized in the present invention is shown in Fig. 3 of the drawings and is disclosed and described in the above-cited application of Bjornson and Bruce. This device has a voltage-current characteristic illustrated in Fig. 4 which shows the relationship between the voltage V across terminals 1 and 2 and the current I flowing from terminal 1 to terminal 2. As the current through the device rises, the voltage across it also rises until a critical voltage is reached. When this critical voltage is reached, the voltage across the device rapidly decreases as the current continues to increase. This region of decreasing voltage with increasing current is frequently referred to as a negative resistance region. After passing through the negative resistance region, the current through the device continues to increase while the voltage across it levels off and increases only slightly. From a study of the voltage-current relationship shown in Fig. 4, it is evident that the circuit of Fig. 3 presents a very high impedance until the critical voltage is reached at which time the circuit of Fig. 3 quickly changes from its high impedance to its low impedance state. Resistor R, shown in Fig. 3 connected between the base and emitter electrodes of transistor T, controls the magnitude of the critical potential at which the device changes its impedance state. If resistor R is increased in magnitude, the critical potential at which transistor T will change from its high impedance state to its low impedance state will be decreased in magnitude.

As shown in Fig. 1 of the drawings, condensers C1 through C0 are connected in a parallel chain circuit with a transistor two-terminal, voltage responsive device such as described above with reference to Fig. 3 interposed between each of the condensers in the parallel chain. In series with each of the condensers C1 through C0 is an associated unilateral conducting device such as a varistor poled as shown in Fig. 1 to permit current to flow from the grounded terminal of source 10 through its associated condenser to conductor 9. For example, varistor V1 permits current to flow from the grounded terminal of source 10 through condenser C1 to conductor 9. Similarly, varistor V2 permits current to flow only from the collector electrode of transistor T1 through condenser C2 to conductor 9.

Key buttons K1 through K0, shown in Fig. 1, are utilized to control the pulsing circuit to produce a desired number of direct-current voltage counting pulses. For example, if key button K1 is operated, a single pulse will be produced or if key button K0 is operated, a train of ten pulses will be produced. The operation of any one of the key buttons K1 through K0, shown in Fig. 1, completes a circuit which may be traced from the negative terminal of source 10 through resistor RL, through the left-hand make contact of the operated one of key buttons K1 through K0 to conductor 9. The operation of any of the key buttons K1 through K0 also places a short-circuit condition through its right-hand make contact across the parallel chain of condensers. This will permit the sequential charging of the condenser in the chain up to the point at which this short-circuit condition is placed and prevents the sequential charging of any of the remaining condensers in the chain. For example, if key button K5 is operated, condensers C1, C2, C3, C4 and C5 will be sequentially charged to a predetermined voltage in the manner to be described hereinafter and the short-circuit condition placed by key button K5 from conductor 9 through the right-hand make contact to the collector electrode of transistor T5 will prevent the sequential charging of condensers C6, C7, C8, C9 and C0.

At the instant that any of the key buttons K1 through K0 is operated, condensers C1 through C0 are discharged and, therefore, are essentially a short circuit. As a result, the voltage across resistor RL will essentially be equal in magnitude to the magnitude of the potential of source 10. This means that point *a* in the circuit of Fig. 1 is at a negative potential with respect to ground, that is, equal in magnitude to the potential of source 10, and that point *b* in the circuit of Fig. 1 is essentially at zero or ground potential, assuming that the forward resistance of varistor V1 is so small as to be negligible. As condenser C1 charges as a result of the current flow from the grounded terminal of source 10 through condenser C1 and varistor V1 over conductor 9 through the left-hand make contact of the operated one of key buttons K1 through K0, through resistor RL to the negative terminal of source 10, the voltage across resistor RL will decrease as the voltage across condenser C1 increases. In other words, as condenser C1 charges, the current flowing through resistor RL decreases. As the charge on condenser C1 increases, the potential at point *b* with respect to ground will decrease negatively from ground or zero potential to a negative potential. Transistor T1 and resistor R1, being connected as the two-terminal, voltage responsive device described above, will present a high impedance to the flow of current from the positive terminal of source 10 through the device and thus will prevent condensers C2 through C0 from receiving an appreciable charge at this time. Because condenser C2 has virtually received no charge, it remains a short circuit and, therefore, the potential at point *b* in the circuit of Fig. 1 is also applied to the collector electrode of transistor T1 which, as shown in Fig. 1, also has its emitter electrode connected to the grounded positive terminal of source 10. Therefore, as the charge on condenser C1 increases, the voltage across the two-terminal, voltage responsive device comprising transistor T1 and resistor R1 also increases. Condenser C1 continues to charge from source 10 until the voltage developed between the emitter electrode and collector electrode of transistor T1 equals the critical voltage at which the device changes from its high impedance state to its low impedance state. When this change takes place, current will flow from the grounded positive terminal of source 10 through transistor T1, which is now in its low impedance state, through condenser C2 and varistor V2 over conductor 9 through the left-hand make contact of the operated one of key buttons K1 through K0 through resistor RL to the negative terminal of source 10. This current will cause condenser C2 to charge in the same manner as condenser C1, previously described. Condenser C1, now being charged, presents a high impedance to the flow of current which charges condenser C2 and, therefore, has no appreciable shunting effect. Transistor T2 and resistor R2, being connected as the two-terminal, voltage responsive device described above, will present a high impedance to the flow of current through transistor T1 and will prevent condensers C3 through C0 from receiving an appreciable charge at this time. Condenser C2 will continue to charge until the voltage developed across transistor T2 reaches the critical value for this device. When this critical voltage is reached, transistor T2 will change from its high impedance state to its low impedance state and will permit current from source 10 through transistor T1 and transistor T2 to charge condenser C3 (not shown in the circuit of Fig. 1). The sequential charging of condensers C1, C2, C3, C4, etc. will continue until all of the condensers in the chain of condensers have been charged or until the point in the chain of condensers is reached where a short-circuit condition has been placed by the operation of one of the key buttons K1 through K0 as described above.

The sequential charging of the condensers C1 through C0 in the manner described above will cause the current flowing through resistor RL to decrease and abruptly increase which will result in direct-current signaling pulses which may be applied to a detector such as detector 8 over conductors 6 and 7.

Figure 5:
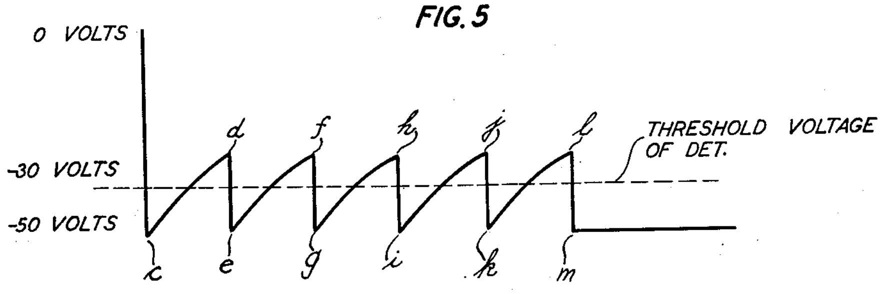
Fig. 5 is a graphic representation of the direct-current voltage pulses generated by the key pulsing circuit of Fig. 1 when the key button representing the digit five is operated.

Fig. 5 shows a graphic representation of the train of direct-current pulses developed across resistor RL and applied to detector 8 over conductors 6 and 7 when key button K5, shown in Fig. 1, is operated.

Assume for the purposes of illustration that source 10 is a minus 50-volt source. Assume further that the value of resistors R1 through R0 have been selected so that their associated transistors T1 through T0 will change from a high impedance state to a low impedance state when a critical voltage of 20 volts is developed across each. At the instant key button K5 is operated, condensers C1 through C0 are discharged and are essentially a short circuit. Therefore, the voltage across resistor RL at the instant key button K5 is operated is the full potential of source 10 which, as assumed above, is a minus 50 volts. This is shown at point *c* on the graph of Fig. 5. However, as condenser C1 charges, the voltage across resistor RL will decrease, as shown between points *c* and *d* on the graph of Fig. 5, and condenser C1 will continue to charge until it receives a charge of 20 volts. When condenser C1 attains a 20-volt charge, the voltage developed across resistor RL will be 30 volts which means that point *b* in the circuit of Fig. 1 will be at minus 20 volts with respect to ground. Because condenser C2 has received no appreciable charge and is still essentially a short circuit, the minus 20-volt potential at point *b* will be applied to the collector electrode of transistor T1. Since the emitter electrode of transistor T1 is connected to ground, as shown in Fig. 1, a potential of 20 volts is thereby developed across transistor T1. As assumed above, this is the critical voltage at which transistor T1 will change from its high impedance state to its low impedance state and conduct current readily. The current flowing through transistor T1 is then applied to condenser C2 which, at that instant, is essentially a short circuit so that the voltage across resistor RL increases abruptly to a magnitude essentially equal to the potential of source 10. The increase in voltage developed across resistor RL when transistor T1 changes from its high impedance state to its low impedance state is shown between points *d* and *e* on the graph of Fig. 5. Condenser C1, being charged, presents a high impedance to the flow of current which charges condenser C2 and, therefore, has no appreciable shunting effect. As condenser C2 charges, the voltage appearing across resistor RL will again decrease and will continue to decrease until the charge on condenser C2 reaches 20 volts, as shown between points *e* and *f* on the graph of Fig. 5. When condenser C2 attains a 20-volt charge, the voltage developed across resistor RL will again be approximately 30 volts which means that point *b* in the circuit of Fig. 1 will again be at minus 20 volts with respect to ground. Condenser C3 has received no appreciable charge because of the high impedance state of transistor T2 and is still essentially a short circuit. Thus, the minus 20-volt potential at point *b* will then be applied to the collector electrode of transistor T2. The emitter electrode of transistor T2 is essentially at ground potential because transistor T1 is now in its low impedance state of but a few ohms. Because a 20-volt potential has now been developed across transistor T2, it will immediately change from its high impedance state to its low impedance state and the charging of condenser C3 (not shown in Fig. 1), will commence. The charging of condensers C1, C2, C3, C4 and C5 will take place in the sequence indicated and during the charging period of each condenser, the voltage appearing across resistor RL will decrease as shown in Fig. 5.

Referring to the graph of Fig. 5, condenser C1 charges during the interval between points *c* and *d*, as stated above, transistor T1 changes from its high impedance state to its low impedance state during the interval between points *d* and *e*, and condenser C2 starts charging. Condenser C2 charges during the interval between points *e* and *f*, and transistor T2 changes from its high impedance state to its low impedance state during the interval between points *f* and *g*, and condenser C3 starts charging. Condenser C3 charges during the interval between points *g* and *h*, and transistor T3 changes from its high impedance state to its low impedance state during the interval between points *h* and *i*. Condenser C4 charges during the interval between points *i* and *j*, and transistor T4 changes to its low impedance state during the interval beween points *j* and *k*. Condenser C5 charges during the interval between points *k* and *l*, and transistor T5 changes to its low impedance state during the interval between points *l* and *m*.

After condenser C5 attains the critical charge of 20 volts, the voltage across resistor RL will again be reduced to 30 volts. This means that point *b* in the circuit of Fig. 1 will be at minus 20 volts with respect to ground. This minus 20-volt potential will be applied through the left-hand and right-hand contacts of operated key button K5 to the collector electrode of transistor T5. The emitter electrode of transistor T5 will be essentially at ground potential because transistors T1, T2, T3 and T4 have all changed to their low impedance states. Because a 20-volt potential has now been developed across transistor T5, it will change from its high impedance state to its low impedance state. The short-circuit condition between the collector electrode of transistor T5 and conductor 9 placed there by the operation of key button K5 will prevent any further charging of the subsequent condensers such as C6 C7, etc. in the chain, and the voltage appearing across resistor RL will once again increase to essentially the potential of source 10 or minus 50 volts, as shown at point *m* on the graph of Fig. 5.

To simplify the description given above of the key pulsing circuit shown in Fig. 1, it was assumed that the forward impedance of varistors V1 through V0 was zero and that transistors T1 through T0 had a zero impedance when changed to their low impedance state. The fact that the forward impedance of varistors V1 through V0 is not zero but a few ohms, and the fact that the transistors T1 through T0 have a few ohms impedance when in their low impedance state will not change the general operation described above. However, the magnitude of the potential developed at various points in the circuit will differ by a few volts from those given.

By selecting a suitable threshold or bias voltage for detector 8, as shown in the dotted line in Fig. 5, detector 8 will respond to the chain of counting pulses produced by the key pulsing circuit shown in Fig. 1. Referring to Fig. 5, the portion of the wave form below this threshold voltage during the time the condensers are charging constitutes the pulsing open condition for each pulse and the portion of the wave form above this threshold voltage during the time the condensers are charging constitutes the pulsing closure condition for each pulse. By proper selection of the time constants for sequentially charging the various condensers and the proper selection of a threshold voltage for the operation of the detector 8, pulsing opens and pulsing closures of desired predetermined times are obtainable.

The time constant for charging condenser C1 is determined by the magnitude of resistor RL, condenser C1 and the forward resistance of varistor V1. The time constant for charging condenser C2 is determined by the magnitude of resistor RL, the impedance of transistor T1 in its low impedance state and the forward resistance of varistor V2. Similarly, the time constant for charging condenser C3 is determined by the magnitude of resistor RL, the impedance of transistors T1 and T2 in their low impedance state and the forward resistance of varistor V3. By selecting the proper values for condensers C1 through C0 and resistor RL, the pulsing opens and closures produced by the key pulsing circuit shown in Fig. 1 may be held at predetermined values. For example, the key pulsing circuit of Fig. 1 can, by selecting the proper value for resistor RL and condensers C1 through C0, be arranged to produce direct-current voltage pulses having a 2-millisecond pulsing open and a 2-millisecond pulsing closure.

Varistors V1 through V0, shown in Fig. 1, are poled so that condensers C1 through C0, respectively, after having attained a charge, will not discharge through the preceding transistor during the pulsing operation of the circuit. The varistors do, however, permit the charged condensers to discharge relatively slowly through their back impedance after the pulsing operation is completed.

Figure 2:
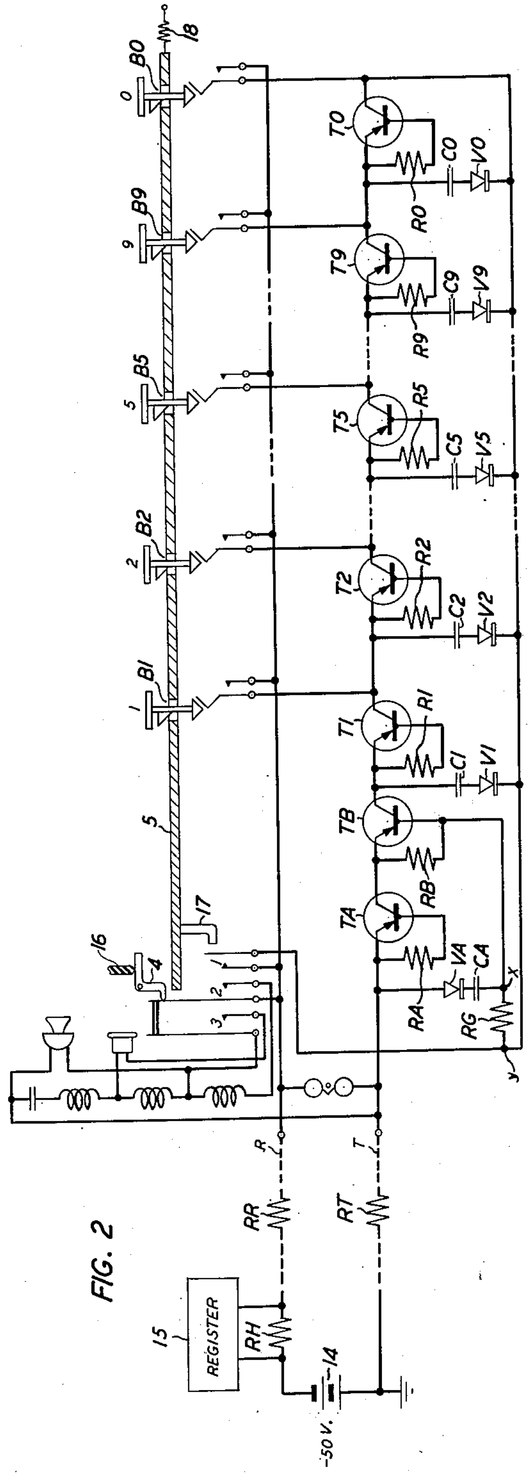
Fig. 2 is a schematic diagram of a subscriber's key telephone set in which the key pulsing circuit of the present invention has been embodied.

The key pulsing circuit described above is particularly adaptable for use at subscriber station sets in telephone switching systems. The pulsing circuit elements required for a ten button key set may be assembled in a small package that can be mounted in place of a dial in a telephone set. The circuit for such a ten button key set is shown in Fig. 2 of the drawings. It will be observed that in addition to the basic pulsing circuit comprising transistors T1 through T0, resistors R1 through R0, condensers C1 through C0 and varistors V1 through V0 described above in connection with Fig. 1, the circuit of Fig. 2 also includes transistors TA and TB with associated resistors RA and RB, resistor RG, condenser CA and varistor VA. The function of these elements will be described hereinafter. A standard telephone talking circuit is shown schematically in Fig. 2 which is bridged across the tip conductor T and ring conductor R of the telephone line by the closure of switchhook contacts 2 and 3. When the handset is removed from its normal on-hook position, cradle button 16 is released which permits switchhook 4 to operate and close switchhook contacts 2 and 3. The ten key buttons which control the pulsing circuit are designated B1 through B0. To save contacts and thereby simplify the design, the circuit of Fig. 2 is based on using a latch plate 5 which is mechanically interlocked with switchhook contacts 2 and 3 so that when any one of the key buttons B1 through B0 is depressed the switchhook contacts 2 and 3 are opened and the telephone talking instruments are removed from the tip and ring conductors of the line. Latch plate 5 has a projection 17 attached thereto and movable therewith so that a latch plate contact designated 1 is closed when latch plate 5 moves to the left in response to the operation of any of key buttons B1 through B0. The closure of latch plate contact 1 connects the transistor pulsing circuit to the tip and ring conductors of the line. Each of the ten key buttons B1 through B0 shown in Fig. 2 has a cam member and when any of the key buttons is depressed its cam member engages latch plate 5 and causes it to move to the left as shown in Fig. 2 to open switchhook contacts 2 and 3 and close latch plate contact 1. Attached to latch plate 5 is spring 18 which is tensioned to cause latch plate 5 to return to its normal position when an operated key button is released. This recloses switchhook contacts 2 and 3 and opens latch plate contact 1. Switchhook contacts 2 and 3 and latch plate contact 1 are arranged to operate in the following sequence. When any of the key buttons B1 through B0 is operated, latch plate contact 1 closes before switchhook contacts 2 and 3 break and when any one of the key buttons B1 through B0 is released, switchhook contacts 2 and 3 make before latch plate contact 1 breaks. The reason for this particular sequence is to prevent unwanted pulses caused by the closure and opening of these contacts from being applied to the line. The ten button key pulsing subscriber set of Fig. 2 is shown connected to the tip and ring conductors T and R, respectively, of a telephone line. Resistor RR, shown in the ring conductor R of the line, represents the resistance in the ring conductor from the central office to the location of the subscriber's set. Similarly, resistor RT, shown in the tip conductor T of the line, represents the resistance in the tip conductor from the central office to the location of the subscriber's set. Battery for the talking circuit and for the pulsing circuit is supplied in the polarity shown over the tip and ring conductors of the line from source 14. Resistor RH, shown in the ring conductor of the line, is the resistor across which the direct-current pulses produced by the pulsing circuit are detected. Register 15 connected across resistor RH is the register in the central office which responds to the direct-current pulses detected in resistor RH.

When a subscriber desires to initiate a call, he will lift his telephone set from the mounting which will cause switchhook 4 to permit switchhook contacts 2 and 3 to close thereby connecting the talking circuit shown in Fig. 2 across the tip and ring conductors of the line. This action will, in the manner well known in the art, engage a register such as register 15 in the central office. The subscriber then proceeds to depress the appropriate key buttons B1 through B0 to transmit high speed direct-current pulses representing the called designation.

The key pulsing circuit of Fig. 2 is similar to the circuit hereinbefore described of Fig. 1 except that in addition to the normal pulsing circuit described in connection with Fig. 1, provision has been made in Fig. 2 for a 40-millisecond open interval followed by a 4-millisecond closure before each train of counting pulses is generated. The 40-millisecond open permits a central office register to distinguish transient pulses caused by speech or switchhook operation from the pulses generated by the key pulsing circuit. The 4-millisecond closure following the open of 40 milliseconds will enable central office registers to distinguish key pulsing from dial pulsing because in the train of counting pulses produced by dial pulsing means, the 40-millisecond open is followed by a 40-millisecond closure. Provision can readily be made in such register circuits for detecting a 40-millisecond open followed by a closure not exceeding 4 milliseconds indicating that the train of counting pulses to be received is being produced by a high speed key pulsing circuit such as shown in Fig. 2. Provision can also be made in these register circuits for detecting a 40-millisecond open followed by a 40-millisecond closure indicating that the train of pulses to be received is being produced by dial pulsing means. With this fundamental facility for distinguishing key pulsing from dial pulsing, central office register circuits can readily be designed for universal operation with key sets or regular dials.

In the circuit of Fig. 2, each of the counting pulses produced consists of an open interval of 2 milliseconds followed by a closed interval of 2 milliseconds. Thus, each train of counting pulses for a single digit is preceded by an open interval of 40 milliseconds followed by a closed interval not exceeding 4 milliseconds and, thereafter, each counting pulse consists of an open of 2 milliseconds followed by a closure of about 2 milliseconds. After the closure of the last counting pulse for a digit, the loop remains closed. The counting pulses for the next digit will be transmitted when the key button of the previous digit is released and the key button of the next digit is depressed.

The operation of the circuit of Fig. 2 will now be described in detail. Assume that a subscriber wishes to transmit a train of counting pulses for the digit 5. The subscriber will remove the telephone set from its mounting which will permit switchhook 4 to close switchook contacts 2 and 3. This, as mentioned above, will connect the talking circuit across the tip and ring conductors of the line. Current flowing from source 14 through resistor RH in the central office is maintained at the level indicated at point *a* in the graphic representation shown in Fig. 6. When key button button B5 is operated, switchhook contacts 2 and 3 are opened and latch plate contact 1 is closed, as described hereinbefore. A circuit may be traced from the negative terminal of source 14 through resistor RH, through resistor RR, over the ring conductor of the line, through latch plate contact 1, through resistor RG, through condenser CA and varistor VA, over the tip conductor of the line, through resistor RT to ground. At the instant that latch plate contact 1 closes, condenser CA is discharged and, therefore, is essentially a short circuit. Resistor RG is of relatively high magnitude, for example, in the order of 200,000 ohms. The current flowing through resistor RH across which register 15 in the central office is connected, immediately drops to a point which is below the threshold value of register 15 as indicated at point *b* on Fig. 6, thus effectively opening the circuit. The threshold current value for register 15 is indicated by the dotted line in Fig. 6. As condenser CA charges over the circuit previously traced, the current flowing through resistor RH in the central office will decrease in the manner shown in Fig. 6 between points *b* and *c*. By selecting the values of resistor RG and condenser CA in conjunction with the values of resistors RH, RR and RT, the time constant for charging condenser CA may be set so that condenser CA will attain a charge of 20 volts in 40 milliseconds.

When condenser CA attains a charge of the order of 20 volts, the potential on the emitter electrode of transistor TA will be 20 volts positive with respect to the potential at point *x* in the circuit of Fig. 2. Resistor RB, connected between the emitter and base electrodes of transistor TB, is of relatively small value and, therefore, essentially the full potential at point *x* will be applied to the collector electrode of transistor TA. Transistor TA in combination with resistor RA forms a two-terminal, voltage responsive device, as described above, which, by properly selecting the value of resistor RA, will change from its high impedance state to its low impedance state when a potential of 20 volts is developed between its emitter and collector electrodes. Therefore, when condenser CA attains a charge of 20 volts, a 20-volt potential will be developed across transistor TA, as described above, and it will change to its low impedance state. When transistor TA changes to its low impedance state, essentially the full potential on the emitter electrode of transistor TA will be applied to the emitter electrode of transistor TB. Because condenser C1 has received no appreciable charge, it is essentially a short circuit and, therefore the potential at point *y* in the circuit of Fig. 2 will be applied to the collector electrode of transistor TB. By properly selecting the value of resistor RB, the critical potential at which transistor TB changes from its high impedance state to its low impedance state can be placed at a higher level than the critical potential for transistor TA. The sum of the critical potentials for transistors TA and TB is greater than the potential available from source 14. However, the critical potential of transistor TB alone is less than the potential available from source 14. The arrangement of the critical potentials for transistors TA and TB in this manner will prevent premature termination of the 40-millisecond open interval. When transistor TA changes from its high impedance state to its low impedance state after the termination of the 40-millisecond open interval, a potential from source 14 higher in value than the critical value of transistor TB is placed across transistor TB, as described above, and transistor TB immediately changes from its high impedance state to its low impedance state. When transistors TA and TB change from their high impedance state to their low impedance state as described above, the current through resistor RH in the central office increases abruptly as shown between points *c* and *d* on the graph of Fig. 6. This change by transistors TA and TB to their low impedance state will permit current to flow through condenser C1. As condenser C1 charges, current in resistor RH decreases as shown between points *d* and *e* on the graph of Fig. 6 until the charge on condenser C1 attains the critical voltage at which transistor T1 changes from its high impedance state to its low impedance state. The value of condenser C1 is selected so that approximately 4 milliseconds will lapse before the current flowing in the resistor RH drops below the threshold value for register 15. Thus, the 4-millisecond closure which follows the 40-millisecond open is obtained. Condenser C1 continues to charge for two more milliseconds, thus giving a 2-millisecond open for the first pulse of the train of counting pulses.

Figure 6:
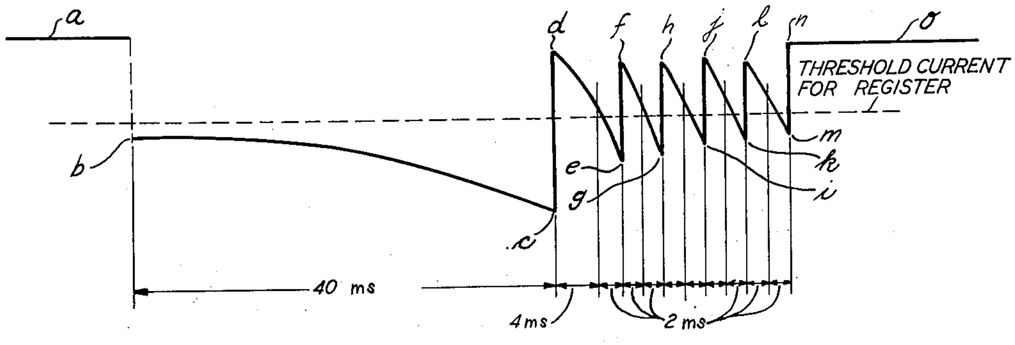
Fig. 6 is a graphic representation of the direct-current pulses produced by the subscriber's key telephone set of Fig. 2 when the key button representing the digit five is operated.

Because central office register circuits are designed to operate on the open interval of a pulse, register 15 in the central office then responds to this first 2-millisecond open to count one pulse. When the charge on condenser C1 attains the critical value and transistor T1 changes from its high impedance state to its low impedance state, the current through resistor RH will abruptly increase as shown between points *e* and *f* in the graph of Fig. 6. This current flowing through transistor T1 will in turn start the charging of condenser C2. As condenser C2 charges, the current through resistor RH decreases as shown between points *f* and *g* on the graph of Fig. 6. The magnitude of condenser C2 is selected so that the current flow through resistor RH will be maintained above threshold value for a 2-millisecond interval, thus giving the 2-millisecond closure for the first pulse. After the current drops below the threshold value indicated by the dotted line in Fig. 6, condenser C2 continues to charge for an additional 2-milliseconds interval, thus causing a 2-millisecond open for the second pulse. The action of the subsequent transistors and condensers in the circuit of Fig. 2 is the same as that described hereinbefore with respect to Fig. 1. Referring to Fig. 6, condenser C3 charges during the interval between points *h* and *i* on the graph of Fig. 6, transistor T3 changes from its high impedance state to its low impedance state between the points *i* and *j* on the graph of Fig. 6, condenser C4 charges during the interval between points *j* and *k* on the graph of Fig. 6, transistor T4 changes from its high impedance state to its low impedance state between points *k* and *l* on the graph of Fig. 6 and condenser C5 charges during the interval between points *l* and *m* on the graph of Fig. 6. When the charge on condenser C5 reaches the critical voltage of transistor T5, transistor T5 changes from its high impedance state to its low impedance state and current through resistor RH increases as shown between points *m* and *n* on the graph of Fig. 6.

When key button B5 was operated, it placed a short between the collector electrode and the battery supplied to the transistor pulsing circuits so as to prevent any further pulses being produced. Therefore, the current flow through resistor RH in the central office will remain substantially at the value indicated at point *o* in the graph of Fig. 6.

When key button B0 is depressed, the 40-millisecond open, as described above, is produced followed by a 4-millisecond closure which in turn is followed by a series of short pulses transmitted successively by pairs of condensers and transistors from condenser C1 and transistor T1 up through condenser C0 and transistor T0. Beyond transistor T0 the circuit is closed without a condenser and no further opens occur. When any key other than the key for the digit 0 is depressed, the number of counting pulses corresponds with the number represented by this key. After the breakdown of the last transistor for the series of this number, a continuous closure is established by the short circuit across the pulsing train of condensers and transistors through the closure of the contact on this key.

What is claimed is:

1. A pulse train generator comprising a plurality of transistors equal in number to a maximum number of pulses to be generated, each transistor having a base, a collector and an emitter, said transistors being arrayed in series with the collector of each but the last connected directly to the emitter of the next succeeding transistor, a source, means for connecting the emitter of the first transistor in the series to one terminal of said source and means for rendering the emitter-collector paths of any successive number of said transistors conductive, in sequence, comprising a common bus, a plurality of timing condensers each associated with one of said transistors and connected between the emitter thereof and said common bus, means for connecting said common bus to the other terminal of said source and means for individually connecting the collector of any of one of said transistors to said other terminal of said source.

2. A pulse train generator comprising a series of transistors each having a base, an emitter and a collector, means directly connecting the collector of each transistor but the last in the series to the emitter of the succeeding transistor, a source, means connecting the emitter of the first transistor in said series to one terminal of said source, a bus, a timing condenser associated with each of said transistors and connected between the emitter thereof and said bus and means for individually connecting the collector of any selected one of said transistors in said series to said bus and concomitantly connecting said bus to said other terminal of said source.

3. A key pulsing circuit comprising a series of transistors each having a base, a collector and an emitter, a plurality of resistors each associated with a respective one of said transistors and connected between the emitter and base thereof, means connecting the collector of each transistor but the last in said series directly to the emitter of the next succeeding transistor in said series, a series of keys each corresponding to a respective digit, each of said keys associated with a respective one of said transistors of said series, a source of potential, a resistor connected in series to one terminal of said source, means connecting the emitter of the first transistor of said series to the other terminal of said source, a common bus, a plurality of condensers each associated with a respective one of said transistors and connected between the emitter thereof and said common bus, means for translating operation of any of said keys into a train of pulses in said resistor corresponding in number to the digit represented by the operated key, said last-mentioned means comprising means for applying a potential from said source through said resistor to said common bus and means responsive to the operation of any of said keys for connecting the collector of the transistor associated therewith to said common bus.

4. The combination of claim 3 wherein said means connecting the emitter of the first transistor of said series to the other terminal of said source comprises a condenser connected to said other terminal of said source, means responsive to said potential applied to said common bus for charging said condenser to a predetermined charge in a predetermined time and means responsive to said predetermined charge in said condenser for connecting said emitter of said first transistor of said series to said other terminal of said source.

5. The combination of claim 3 wherein said means connecting the emitter of said first transistor of said series to the other terminal of said source comprises switching means having a low impedance state and a high impedance state and timing means responsive to said potential applied to said common bus for triggering said switching means to the low impedance state thereof after a predetermined delay whereby the translation of said train of pulses into said resistor is delayed for a predetermined interval.

6. The combination of claim 5 wherein said switching means comprises a pair of transistors each having a base, a collector and an emitter, a pair of resistors each associated with a respective one of said pair of transistors and connected between the emitter and base thereof, means connecting the emitter of the first transistor of said pair to said other terminal of said source, means connecting the collector of said first transistor of said pair to the emitter of the second transistor of said pair and means connecting the collector of said second transistor of said pair to the emitter of said first transistor of said series and wherein said timing means comprises a resistor and a condenser connected between the emitter of said first transistor of said pair and said common bus.

References Cited in the file of this patent

UNITED STATES PATENTS

| | | |
|---|---|---|
| 2,011,381 | Suits | Aug. 13, 1935 |
| 2,268,859 | Döhle | Jan. 6, 1942 |
| 2,323,019 | Döhle | June 29, 1943 |
| 2,403,852 | Desch | July 9, 1946 |
| 2,531,076 | Moore | Nov. 21, 1950 |